United States Patent

[11] 3,634,776

[72] Inventor Norton W. Bell
Pasadena, Calif.

[21] Appl. No. 11,835
[22] Filed Feb. 16, 1970
[45] Patented Jan. 11, 1972
[73] Assignee Bell & Howell Company
Chicago, Ill.
Original application May 29, 1967, Ser. No. 641,843, now abandoned. Divided and this application Feb. 16, 1970, Ser. No. 11,835

[54] PHASE-LOCKED LOOP INCLUDING A PHOTOELECTRIC PHASE DETECTOR
1 Claim, 3 Drawing Figs.

[52] U.S. Cl. .......... 331/25, 307/232, 318/313, 318/314, 328/133, 331/29, 331/172, 331/177 R
[51] Int. Cl. .......... H03b 3/04, H03d 13/00
[50] Field of Search .......... 331/18, 25, 29, 172, 177 R, 177 V; 328/133, 134; 307/232; 318/313, 314

[56] References Cited
UNITED STATES PATENTS
2,026,382 12/1935 Frum .......... 331/25
2,281,954 5/1942 Rinia .......... 318/313 X

*Primary Examiner*—John Kominski
*Assistant Examiner*—Siegfried H. Grimm
*Attorney*—Christie, Parker & Hale

ABSTRACT: Apparatus for locking the frequency and phase of an output signal to a reference alternating signal, the apparatus having a photoconductive cell exposed to a light beam modulated at substantially the same frequency as the reference frequency and receiving electric reference signals from a secondary source. A resulting voltage across the cell is used to control the frequency of the output signal to the frequency of the reference signals.

INVENTOR.
NORTON W. BELL
BY
Christie, Parker & Hale
ATTORNEYS.

INVENTOR
NORTON W. BELL
BY
Christie, Parker & Hale
ATTORNEYS.

PHASE-LOCKED LOOP INCLUDING A PHOTOELECTRIC PHASE DETECTOR

CROSS-REFERENCE TO RELATED APPLICATION

This is a division of application Ser. No. 641,843, filed May 29, 1967, now abandoned.

BACKGROUND OF THE INVENTION

This invention relates to devices for locking the phase of an output signal to the phase of an external reference frequency.

Presently the usual method to lock the phase of a signal source relative to the frequency of a reference signal is to generate a signal having a phase keyed to an output signal of the signal source. This signal is applied to a phase comparison circuit that produces electric signals related to the difference between the phase of an external reference signal and the phase of the velocity-responsive signal. The output of the comparison circuit is then used to control the signal source to keep the two signals in place.

The necessity of having to provide a comparison circuit made these devices expensive to manufacture and made them subject to malfunction.

SUMMARY OF THE INVENTION

The present invention provides an apparatus that utilizes a photoelectric device for the phase comparison circuit. It includes a photoconductive cell which is exposed to a light beam modulated in phase with the output of the signal source. An AC reference voltage signal is applied across the cell having the same frequency as the modulated light. A voltage is produced across the photoresistor having a DC component that is a function of the relative phase between the reference signal and the modulated light falling on the photoresistor. Changes in the DC component of the voltage are used to control the frequency of the signal source. The phase of the signal source can thereby be locked to the phase of the reference signal.

By eliminating the need for a comparison circuit, the danger of malfunctioning of the device is substantially reduced. In addition, the apparatus is more economical to produce.

DESCRIPTION OF THE PREFERRED EMBODIMENTS

Figure 1:
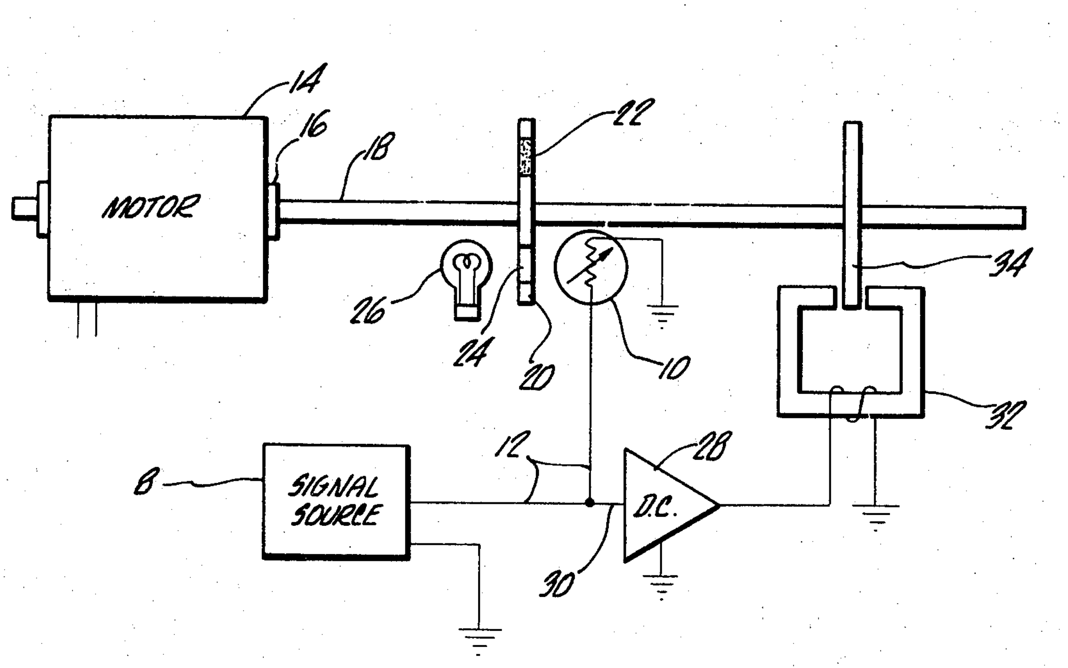
FIG. 1 is a schematic diagram of an apparatus built according to this invention.
Figure 2:
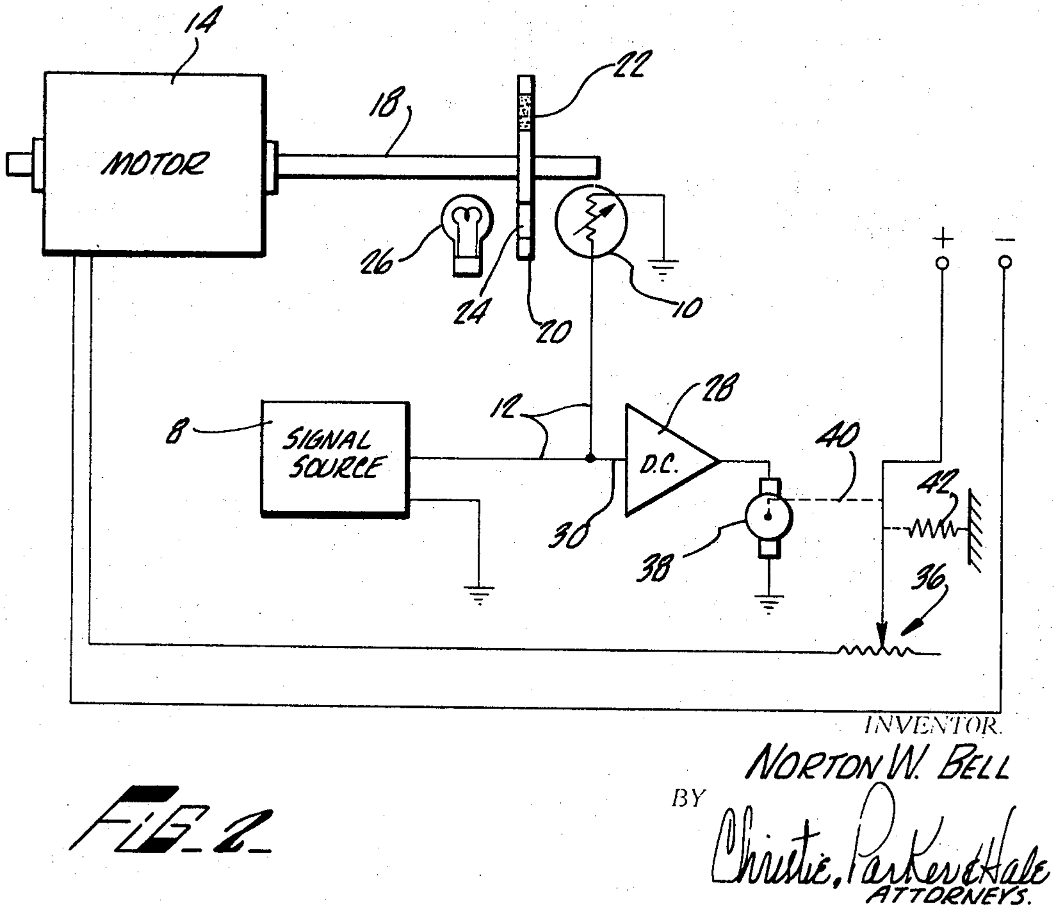
FIG. 2 is a schematic diagram wherein this invention is employed to control the voltage supplied to an electric motor.

As shown in FIGS. 1 and 2, the electric sensing device of this invention is the same in both embodiments. It includes a source 8 of an AC reference signal of substantially constant current that is connected to a photoconductive cell 10 by leads 12. The cell is a photoresistor, the resistance of which varies with the level of incident light. An electric motor 14 includes a rotor 16 mounted on a shaft 18. A circular member 20, which is preferably a disc, includes alternating opaque and translucent segments 22 and 24 secured to the shaft 18. The segments are arranged in a circle such that the opaque and the translucent segments pass adjacent a light source 26 when the disc rotates with the shaft. The photoconductive cell 10 is mounted adjacent the segments in the disc and opposite the light source such that light from the light source falls into the cell when a translucent segment is disposed between the light source and the cell.

Figure 3:
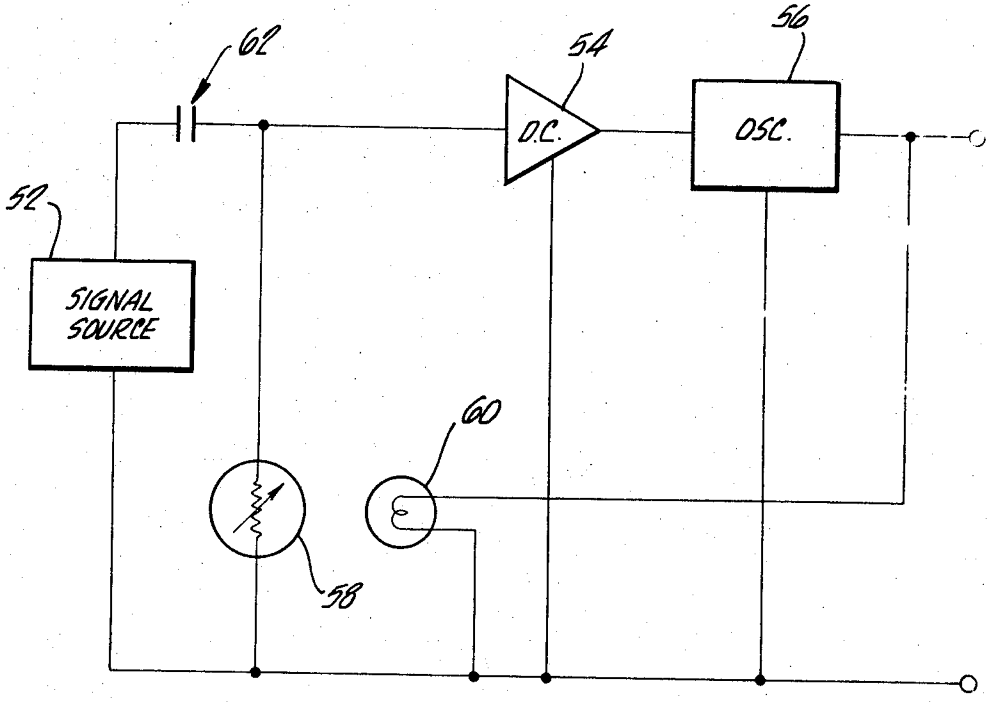
FIG. 3 is a schematic diagram showing a tracking filter provided with a phase comparison device constructed according to this invention.

The light can be modulated other than by mechanical means. As shown in FIG. 3 the light may be modulated by subjecting the light source to electric signals of a frequency equal to the frequency of the secondary signals which are to be locked to the reference signals.

The reference signal from source 8 creates an alternating voltage across the cell, the peak amplitude of which is a function of the internal resistance of the cell. The current through the cell can be represented by a Fourier series. Its magnitude varies according to the following expression:

$$i=\sum_{n=0}^{\infty} I_n \cos (n\omega+\phi_n)$$

wherein $I_n$ is the peak amplitude of each harmonic $n$ of the alternating current through the cell and $\phi_n$ is the phase angle of each harmonic. The cell resistance $r$, which varies because of the modulated light falling on the cell, may be represented by a similar series and is $$r=\sum_{n=0}^{\infty} R_n \cos (n\omega+\theta_n)$$

wherein $R_n$ is the peak amplitude of each beam of the series and $\theta_n$ is the phase angle of each term of the series.

From Ohm's law the voltage $V$ equals $ir$. It can be seen that the photoconductive cell functions as a product demodulator or phase-sensitive detector. The exact relation between the voltage across the cell and the difference between the phase of the reference signal and the light beam can be seen by combining the above two equations. Therefore, considering the fundamental components of the current and resistance series, $$V=ir=I_1\cos(\omega+\phi_1)R_1 \cos(\omega+\theta_1)$$

$$=\frac{I_1R_1}{2} \cos (2\omega+\phi_1+\theta_1)+\cos (\phi_1-\theta_1)$$

The second term of the last equation shows that the average voltage across the cell is related to the difference between the phase of the reference signal and the phase of the variable resistance, which is the same as the phase of the disc. Since the voltage across the cell is a function of both the phase of the light beam, which is the same as the phase of the rotor, and the phase of the reference signal, the photoconductive cell acts as a light-sensitive phase comparison device. By suitably sensing the average or DC component of the voltage across the cell and using it to control the angular velocity of the rotor, the phase of the rotor may be locked to the phase of the reference signal.

In a presently preferred embodiment the apparatus includes a DC amplifier 28 connected with the cell by a ground connection and by a lead 30. The DC amplifier at the same time acts as a low-pass filter and removes higher harmonic components in the voltage across the cell 10 such that the output signal is a substantial DC signal indicating the average voltage across the cell. The voltage across the cell is sensed and amplified by the amplifier and is then used to control the angular velocity of the rotor in any one of several ways.

As shown in FIG. 1, the electric signals emitted by the amplifier are applied to an electromagnet 32 disposed adjacent a rotating disc 34 which is secured to the shaft 18. The magnet induces eddy currents in the disc which produce a drag torque on shaft 18. The torque reduces the angular velocity of the rotor. The amplifier and the electromagnet are constructed such that at any instance the torque produced by the eddy currents slows the rotor just enough to lock its phase relative to the phase of the reference signal.

In FIG. 2 there is shown a DC motor 14, the speed of which is controlled by a potentiometer 36. An electric torque motor 38 is energized in response to the magnitude of the signals from the amplifier and is operatively connected to the potentiometer by a suitable linkage 40. A spring 42 is connected to the linkage and opposes the torque motor to permit proper actuation of the potentiometer. Other motor speed controls, such as an electrically actuated mechanical brake, can be employed to regulate the speed of the motor. Since all of them are well-known methods they are not further described or illustrated.

The electric signals from source 8 may come from a variety of devices that require an electric motor to run synchronized with the signals. For example, the source of the reference signals may be a slant-track video recorder requiring a head-disc drive motor to be synchronized with the phase of the video signal being recorded. Or the signal may come from a movie camera or a projector to synchronize a tape recorder with the camera or the projector to produce a so-called "lip sync" between the sound and the picture.

In another preferred embodiment of the invention which is shown in FIG. 3, a phase-locked tracking loop or filter is employed wherein the output frequency of the loop is responsive to an input frequency. A signal source 52 emits input signals of a varying frequency which are to be tracked. The input signals are fed to a low-pass filter 54, which preferably is a DC amplifier, to remove the input signal frequency and harmonics, and subject a voltage-controlled oscillator 56 to an average or DC voltage. The oscillator modulates the DC signals, which are then used in a secondary circuit, say an AC motor (not shown), in response to the frequency of the signals from source 52.

To lock the frequency of the output signals from the oscillator 56 to the frequency of the signals from source 52, a photoconductive cell 58 is connected to the low-pass filter 54 parallel with the signal source. A source of light 60, its light being modulated in phase with the output signals, subjects the cell to modulated light. The average voltage across the cell is secured by the low-pass filter 54, amplified and used to control the frequency of the output signals from oscillator 56. To prevent the signal source 52 from shorting the DC output of the cell a bypass capacitor 62 is disposed intermediate the cell and the signal source.

Changes in the frequency of the signals from source 52 result in corresponding changes of the average DC voltage across cell 58. The voltage changes across the cell are amplified in filter 54 and used to vary the frequency of the signals emitted by the oscillator 56 in response to changes in the frequency of the input signals. The frequency of the output signals is thereby locked to the frequency of the input signals.

With this embodiment of the invention a reference signal of varying frequency can be employed for use in secondary circuit without subjecting the secondary circuit to noise or harmonic distortions that may be present in the reference signal. They are eliminated in the cell 58 and the low-pass filter 54 respectively. The output signal however continues to be in phase with the input signal since voltage variations across the cell are received by the oscillator and are used to control the frequency of the output signals in response to the input frequency.

What is claimed is:

1. A tracking filter for generating an output signal locked in phase with an input reference signal, the tracking filter comprising:
   - a photoconductive cell having an internal resistance that varies with the level of incident light,
   - means for coupling the reference signal across the cell,
   - voltage-controlled oscillator means for providing an output signal, the frequency of the output signal varying with the voltage level of the input,
   - means for varying the light incident on the cell in synchronism with the output signal from the oscillator means, and
   - low-pass filter means for coupling the voltage across the cell to the input of the oscillator means for providing a DC voltage which varies in response to the average voltage across the cell.

* * * * *